3,553,231
BICYCLO[2.2.2]OCT-5-ENE-BIS(2,3-DICARBOX-
IMIDE) COMPOUNDS
Milton Wolf, West Chester, Pa., assignor to American
Home Products Corporation, New York, N.Y., a corporation of Delaware
No Drawing. Filed Mar. 12, 1968, Ser. No. 712,367
Int. Cl. C07d 27/28
U.S. Cl. 260—326                                8 Claims

ABSTRACT OF THE DISCLOSURE

The invention is directed to bicyclo[2.2.2]oct-5-ene-bis(2,3-dicarboximide) compounds which have central nervous system activity as depressants.

This invention relates to new and novel bicyclo[2.2.2]-oct-5-ene-bis(2,3 - dicarboximide)compounds. The compounds within the purview of the present invention are exemplified by those having the following formula:

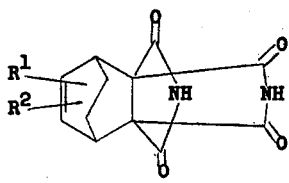

Where $R^1$ and $R^2$ are selected from the class consisting of hydrogen, lower alkyl, phenyl, halophenyl, lower alkoxyphenyl, and trifluoromethylphenyl.

As used herein, the terms "lower alkyl," "lower alkoxy" and the like, describe groups containing from one to about four carbon atoms.

A typical example of a compound of this invention which is depicted by structural Formula I is bicyclo-[2.2.2]oct-5-ene-bis(2,3-dicarboximide).

The new and novel compounds of this invention may be prepared by the process which is hereinafter schematically illustrated.

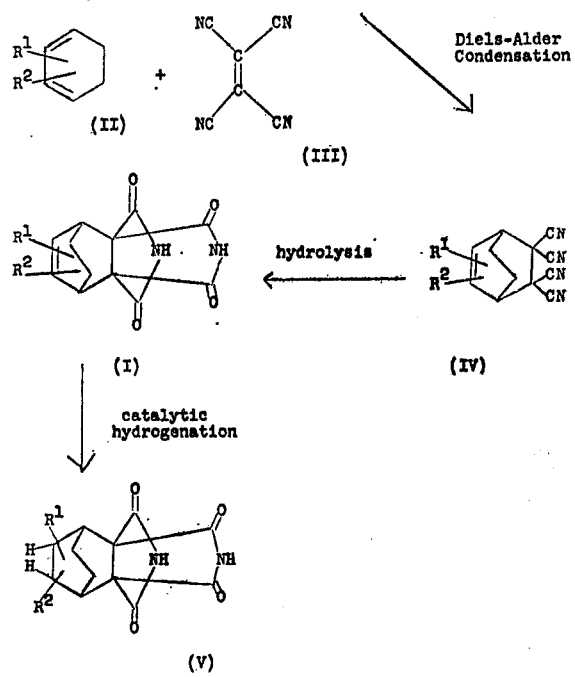

where $R^1$ and $R^2$ are as described above.

The starting material, bicyclo[2.2.2]oct-5-ene-2,2,3,3-tetracarbonitrile (IV) may be prepared, as is known in the art, by the Diels-Alder condensation of cyclohexadiene (II) and tetracyanoethylene (III).

To prepare a bicyclo[2.2.2]oct-5-ene-bis(2,3-dicarboximide) (I) of the present invention a strong aqueous acid solution is added to a bicyclo[2.2.2]oct-5-ene-2,2,3,3-tetracarbonitrile (IV) and heated at a temperature range of about 80° C. to about reflux, preferably at reflux temperature for a period of about 10 to about 72 hours, preferably thirty-two hours. The product may be recovered by well-known techniques. For instance, the product is collected by filtration of the hot mixture, followed by washing with water and drying. Recrystallization of the crude product from a suitable solvent, e.g., dimethylformamide-water, nitromethane-water, acetonitrile-water, dimethylacetamide-water, etc., affords the product.

The preferred aqueous acid solution is approximately a 25 normal sulfuric acid solution. However, any mineral acid, strong organic acid, or mixtures thereof, may be utilized. Especially advantageous are a mixture of hydrogen bromide, acetic acid and water, and a mixture of hydrogen chloride, acetic acid and water.

As is shown in the foregoing schematic diagram the bicyclo[2.2.2]oct-5 - ene-bis(2,3 - dicarboximide) compounds (I) of this invention may be hydrogenated to form their corresponding bicyclo[2.2.2]octane-bis(2,3-dicarboximide) compounds (V). The latter products may be produced by the following procedure. An alkaline aqueous solution of a bicyclo[2.2.2]oct-5-ene-bis (2,3-dicarboximide) (I) is hydrogenated under 1 to 5 atmospheres of hydrogen, preferably three atmospheres, at a temperature range from room temperature to about 100° C., preferably room temperature, for a period of from about 1 to 72 hours with a catalyst, such as palladium-on-charcoal catalysts, a platinum catalyst, or a Raney nickel catalyst. After the takeup of hydrogen is complete, the catalyst is separated by filtration, and the filtrate acidified to precipitate the crude product. The product may be recovered by well-known techniques. For instance, filtration and subsequent recrystallization of the crude product from dimethylformamide and water afford an appropriate bicyclo[2.2.2]oct - 5 - ene-bis(2,3-dicarboximide) (I).

The new and novel bicyclo[2.2.2]oct-5-ene-bis(2,3-dicarboximide compounds of the present invention have utility in experimental and comparative pharmacology. In this regard the compounds are central nervous system depressants. That is, they produce a calming effect in the host.

In the pharmacological evaluation of the biological activity of the compounds of this invention, the in vivo effects are tested as follows. The compound to be tested is administered orally or intraperitoneally to three mice (14 to 24 grams) at each of the following doses: 400, 127, 40 and 12.7 milligrams per kilogram of host body weight. The animals are watched for a minimum of two hours during which time signs of general stimulation (increased spontaneous motor activity, hyperactivity on tactile stimulation, twitching), general depression (decreased spontaneous motor activity, decreased respiration), autonomic activity (miosis, mydriasis, diarrhea) are noted.

The bicyclo[2,2,2]oct-5-ene-bis(2,3 - dicarboximide) compounds (I) of the present invention induce central nervous system depressant effects when all the doses of the foregoing procedure are administered either intraperitoneally or orally. The effect is more marked where the dosage is administered intraperitoneally.

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups, and then dehydrated sufficiently to make it suitable for pressing into a solid form. They may be administered orally in the form of solutions which may contain coloring and flavoring agents or they may be injected parenterally, that is intra-muscularly, intravenously or subcutaneously. For parenteral administration they may be used in the form of sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims.

EXAMPLE I

The following example illustrates the preparation of bicyclo[2.2.2]oct-5-ene-bis(2,3-dicarboximide).

A solution of 100 milliliters (ml.) of 36 N sulfuric acid in 160 ml. of distilled water is added to 20.8 grams (g.) of bicyclo[2.2.2]oct-5-ene-2,2,3,3-tetracarbonitrile, and the resulting mixture is refluxed for 32 hours. The colorless product is collected by filtration of the hot mixture, washed with water, and dried. A yield of 7.55 g. is obtained which is 30.6 percent of theoretical yield. Recrystallization of the crude product from dimethyformamide-water affords 6.0 g. (24.3 percent of the theoretical yield) of the colorless prisms having a melting point greater than 360° C.

Based on the formula $C_{12}H_{10}N_2O_4$ it is calculated that the elemental analysis by weight will be 58.54 percent carbon, 4.10 percent hydrogen, 11.38 perecnt nitrogen. The product is analyzed, and the content is found to be 58.46 percent carbon, 3.97 percent hydrogen and 11.41 percent nitrogen. The foregoing may be expressed:

*Analysis.*—Calc'd for $C_{12}H_{10}N_2O_4$ (percent): C, 58.54; H, 4.10; N, 11.38: Found (percent) C, 58.46; H, 3.97; N, 11.41.

EXAMPLES II–IV

Proceeding as in Example I, but substituting an appropriate compound for bicyclo[2.2.2]oct-5-ene-2,2,3,3-tetracarbonitrile, the following products are afforded:

| Ex. | Starting material | Product |
| --- | --- | --- |
| I | 1-methylbicyclo[2.2.2]oct-5-ene-2,2,3,3-tetracarbo-nitrile. | 1-methylbicyclo[2.2.2]oct-5-ene-bis(2,3-dicarboximide). |
| III | 5-ethylbicyclo[2.2.2]oct-5-ene-2,2,3,3-tetracarbo-nitrile. | 5-ethylbicyclo[2.2.2]oct-5-ene-bis'2,3-dicarboximide). |
| IV | 5,6-dibutylbicyclo[2.2.2]oct-5-ene-2,2,3,3-tetracarbo-nitrile. | 5,6-dibutylbicyclo[2.2.2]oct-5-ene-bis(2,3-dicarboximide). |

EXAMPLE V

An aqueous solution of 260 milliliters of 25 N sulfuric acid is added to 0.20 mole (M) of 5-phenylbicyclo-[2.2.2]oct-5-ene-2,2,3,3-tetracarbonitrile and the resulting mixture is refluxed for 32 hours. The product is collected, washed with water and dried. Recrystallization of the crude product from nitromethane-water affords the product, 5 - phenylbicyclo[2.2.2]oct-5-ene-bis(2,3-dicarboximide).

EXAMPLES VI–IX

Proceeding as in Example V, but substituting the following starting compounds affords the following products:

| Ex. | Starting material | Product |
| --- | --- | --- |
| VI | 1-(p-chlorophenyl)bicyclo[2.2.2]oct-5-ene-2,2,3,3-tetracarbonitrile. | 1-(p-chlorophenyl)-bicyclo[2.2.2]oct-5-ene-bis(2,3-dicarboximide). |
| VII | 4-(p-fluorophenyl)bicyclo[2.2.2]oct-5-ene-2,2,3,3-tetracarbonitrile. | 4-(p-fluorophenyl)bicyclo[2.2.2]oct-5-ene-bis(2,3-dicarboximide). |
| VIII | 5-(m-bromophenyl)bicyclo[2.2.2]oct-5-ene-2,2,3,3-tetracarbonitrile. | 5-(m-bromophenyl)-bicyclo[2.2.2]oct-5-ene-bis(2,3-dicarboximide). |
| IX | 5-ethyl-6-(p-iodophenyl)bicyclo[2.2.2]oct-5-ene-2,2,3,3-tetracarbonitrile. | 5-ethyl-6-(p-iodophenyl)bicyclo[2.2.2]oct-5-ene-bis(2,3-dicarboximide). |

EXAMPLE X

A solution of 250 milliliters of a mixture of hydrogen chloride, acetic acid and water is added to 0.10 mole of 5 - (p - methoxyphenyl)bicyclo[2.2.2]oct-5-ene - 2,2,3,3-tetracarbonitrile, and the resulting mixture is heated at 80° C. for 72 hours. The product is collected, washed with water, and dried. Recrystallization of the crude product from acetonitrile - water affords the product 5-(p-methoxyphenyl)bicyclo[2.2.2]oct - 5 - ene - bis(2,3-dicarboximide).

EXAMPLES XI–XIV

Proceeding as in Example X, but substituting the following starting materials affords the following products:

| Ex. | Starting material | Product |
| --- | --- | --- |
| XI | 5-(p-ethoxyphenyl)bicyclo[2.2.2]oct-5-ene-2,2,3,3-tetracarbonitrile. | 5-(p-ethyoxphenyl)bicyclo[2.2.2]oct-5-ene-bis(2,3-dicarboximide). |
| XII | 5-(m-butoxyphenyl)bicyclo[2.2.2]oct-5-ene-2,2,3,3-tetracarbonitrile. | 5-(m-butoxyphenyl)bicyclo[2.2.2]oct-5-ene-bis(2,3-dicarboximide). |
| XIII | 5-(p-trifluoromethylphenyl)bicyclo[2.2.2]oct-5-ene-2,2,3,3-tetracarbonitrile. | 5-(p-trifluoromethylphenyl)bicyclo[2.2.2]oct-5-ene-bis(2,3-dicarboximide). |
| XIV | 5-(p-methoxyphenyl)-6-methylbicyclo[2.2.2]oct-5-ene-2,2,3,3-tetracarbonitrile. | 5-(p-methoxyphenyl)-6-methyl-bicyclo[2.2.2]oct-5-ene-bis(2,3-dicarboximide). |

EXAMPLE XV

The following example illustrates the preparation of bicyclo[2.2.2]octane-bis(2,3-dicarboximide).

A solution of 2.46 grams bicyclo[2.2.2]oct-5-ene-bis-(2,3-dicarboximide), obtained from Example I, in 100 milliliters of distilled water containing 0.85 gram of sodium hydroxide is hydrogenated at three atmospheres with a 10 percent palladium-on-charcoal catalyst (0.2 gram). After the takeup of hydrogen is complete, the catalyst is separated by filtration and the filtrate acidified to liberate the crude product. Recrystallization of the crude product from dimethylformamide-water affords colorless crystals of bicyclo[2.2.2]octane-bis(2,3-dicarboximide).

The terms and expressions which have been employed are used as terms of description and not of limitation and there is no intention in the use of such terms and expressions of excluding any equivalents of the features shown and described or portions thereof, but it is recognized that various modifications are possible within the scope of the invention claimed.

What is claimed is:
1. A compound selected from the class having the formula:

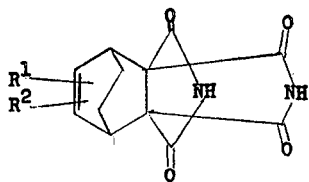

where $R^1$ and $R^2$ are selected from the class consisting of hydrogen, lower alkyl, phenyl, halophenyl, lower alkoxyphenyl, and trifluoromethylphenyl.

2. A compound as defined in claim 1 which is bicyclo-[2.2.2]oct-5-ene-bis(2,3-dicarboximide).

3. A compound as defined in claim 1 which is 1-methyl-bicyclo[2.2.2]oct-5-ene-bis(2,3-dicarboximide).

4. A compound as defined in claim 1 which is 5-ethyl-bicyclo[2.2.2]oct-5-ene-bis(2,3-dicarboximide).

5. A compound as defined in claim 1 which is 5-phenylbicyclo[2.2.2]oct-5-ene-bis(2,3-dicarboximide).

6. A compound as defined in claim 1 which is 4-(p-fluorophenyl)bicyclo[2.2.2]oct - 5 - ene-bis(2,3-dicarboximide).

7. A compound as defined in claim 1 which is 5-(p-methoxyphenyl)bicyclo[2.2.2]oct - 5 - ene-bis(2,3-dicarboximide).

8. A compound as defined in claim 1 which is 5-(p-trifluoromethylphenyl)bicyclo[2.2.2]oct - 5 - ene-bis(2,3-dicarboximide).

References Cited

UNITED STATES PATENTS 3,140,308   7/1964   Cairns et al. _____ 260—465

OTHER REFERENCES

Noller: "Chemistry of Organic Compounds," pp. 890, 1064.

ALEX MAZEL, Primary Examiner

J. A. NARCAVAGE, Assistant Examiner

U.S. Cl. X.R.

260—464; 424—274